(12) United States Patent
Murphy et al.

(10) Patent No.: US 6,390,822 B1
(45) Date of Patent: May 21, 2002

(54) JOB SPECIFIC TUTORIAL SYSTEM

(76) Inventors: David Wayne Murphy, 6305 Channing Rd., Greensboro, NC (US) 27410; Gary Lee Collins, 4605 Pennoak Rd., Greensboro, NC (US) 27407

( * ) Notice: Subject to any disclaimer, the term of this patent is extended or adjusted under 35 U.S.C. 154(b) by 0 days.

(21) Appl. No.: 09/522,462

(22) Filed: Mar. 9, 2000

(51) Int. Cl.[7] ........................ G09B 19/00; G09B 19/06; G09B 19/08
(52) U.S. Cl. ...................................... 434/219; 404/157
(58) Field of Search ................................ 434/219, 156, 434/157, 185, 220, 221, 222, 223, 224, 225, 226, 227, 228, 229, 230, 231, 232, 233, 234, 235, 307 R, 307 A, 308, 309, 310–321, 322–364, 365

(56) References Cited

U.S. PATENT DOCUMENTS

| | | | |
|---|---|---|---|
| 3,271,884 A | 9/1966 | Roberson | 434/157 |
| 3,871,115 A | 3/1975 | Glass et al. | 434/157 |
| 4,428,733 A | 1/1984 | Kumar-Misir | 434/363 |
| 5,275,569 A | * 1/1994 | Watkins | 434/157 |
| 5,275,818 A | 1/1994 | Kind | 434/157 |
| 5,851,117 A | 12/1998 | Alsheimer et al. | 434/219 |
| 5,885,083 A | 3/1999 | Ferrell | 434/156 |

FOREIGN PATENT DOCUMENTS

WO    WO-96/25713 A1 *  8/1996 ........... G06F/17/28

OTHER PUBLICATIONS

Panasonic Omnivision VHS Operating Instructions, Models PV–9401/PV–9451, Apr. 1998, pp. 6, 7, 38, 40.*

Boston Heavy–Duty Stapler No. 131 Instructions, Hunt Mfg. Co.*

* cited by examiner

Primary Examiner—John Edmund Rovnak
(74) Attorney, Agent, or Firm—Coats & Bennett, P.L.L.C.

(57) ABSTRACT

A system for training an individual phrases associated with a job and in a language foreign to the individual. The system includes a first list of phrases associated with the job in a language native to the individual and a second list of phrases associated with the job in a language foreign to the individual. Each of the phrases in the second list corresponds to a different one of the phrases in the first list. Illustrative icons and audio formats are also available to further enhance the learning and recognition of the foreign words.

24 Claims, 3 Drawing Sheets

JOB SPECIFIC TUTORIAL SYSTEM

FIELD OF THE INVENTION

The present invention relates generally to a tutorial system and, more particularly, a tutorial system for teaching job specific words and phrases in at least two separate languages.

BACKGROUND OF THE INVENTION

Many jobs in the marketplace today utilize a diverse workforce comprised of persons from a wide variety of cultural and geographic backgrounds. Many of these people can only communicate in their native language and cannot speak or comprehend any other language. For example, within the United States where the dominant language is English, there are many persons who speak Spanish and know only a limited number of English words. Because these persons are employed in the work force, a number of problems have resulted.

When these persons initially begin work, it is difficult to instruct them properly on how to perform their jobs. Basic criteria may be able to be sufficiently communicated, but specific and technical requirements necessary when performing the job are almost impossible to communicate effectively such that the new employee understands their responsibility. Improper training inevitably results in the employee not satisfactorily performing their jobs to the expected levels, and may even endanger the new employee or others working with them if precautionary safety instructions are not properly understood.

Another problem occurs for supervisors who attempt to communicate with these persons. Communication on the job is either not effective, or is extremely difficult and frustrating for both the supervisor attempting to explain a component of the job, and the worker who cannot understand what is being explained to them. Again, this results in the job not being properly completed, taking too much time, or one or both parties becoming frustrated because of lack of communication.

One method of overcoming these problems is to teach the employees and supervisors the necessary foreign language. There are numerous manners of teaching languages, such as that disclosed in U.S. Pat. No. 3,271,884 to Roberson and herein incorporated by reference in its entirety. However, a drawback to these systems is that they must begin on a very fundamental and basic level learning basic words that are part of the language, but words that are not necessary for performing the specific job for which they are responsible. Although these methods will eventually allow the person to speak the foreign language, they are very time consuming and expensive. By the time the person has learned the foreign language with enough adequacy to speak the specifics necessary for their job, an extended period of time may have evolved. This is especially problematic in many jobs, such as within the service industry, in which turnover is very high and the average employee has a relatively short work history with a single employer.

Other methods have included pictorial illustrations of the necessary steps in performing specific jobs such as that disclosed in U.S. Pat. No. 5,851,117 to Alsheimer et al., herein incorporated by reference in its entirety. These methods illustrate the various tasks and include a brief description of the job requirements. However, the explanations only appear in a single language. These methods may assist an employee who can already speak the necessary language, but they are not effective in conveying the information in a foreign language.

Ideally, there would be a system that would illustrate the specific jobs; include words and phrases specific to the tasks and functions necessary for performing that job; and display the corresponding words and phrases in at least two separate languages. This system both trains the supervisors and employees on the necessary components of the job and also teaches language skills necessary for performing specific tasks.

SUMMARY OF THE INVENTION

The present invention is directed to a training device for teaching a user how to communicate. The device teaches the user words and phrases necessary for performing a job in two languages. This device is especially helpful for persons initially learning the required aspects of a job, and also for supervisory personnel who need to communicate with employees working for them. The device includes a display illustrating a first word set in a first language and a second corresponding word set in a second language. The first and second word sets are placed in a correlating manner within the display to allow the user to recognize the correlation between the languages.

The device may be accessed in a computer format such that a person reads the words on a monitor and manipulates the displays via a mouse, or keypad. The device may also provide for icons illustrating the various words and phrases, and an audio format for playing them in either language.

When using the invention, the device displays a first menu having predefined job areas that appear in a first language and a second language. The user inputs their desired selection, and the corresponding plurality of words is displayed relating to the selected predefined job area in the first and second languages. Within the displays, illustrations may be placed, as well as audio formats.

DETAILED DESCRIPTION OF THE INVENTION

The present invention is directed to instructing both supervisors and employees a variety of predetermined words and phrases necessary for performing specific jobs. This may be used to both instruct a person unfamiliar with a job the required steps in properly performing the job, and also teach them the necessary words and phrases within the foreign language. The invention may further provide for illustrating icons representative of the words and phrases and may also include an audio format for allowing the user to speak and recognize the language.

The present description uses the invention for teaching supervisors and employees various aspects of their jobs. It is to be understood that the invention may also be utilized for users in other applications such as teacher/student, etc. The description is further described and illustrated with reference to job areas, words, and phrases encountered within the industrial cleaning arena. One skilled in the art will understand that the invention may also be used in a variety of other applications including the construction industry, landscaping industry, food services, law enforcement, medical, banking, general warehousing and distribution, etc.

Figure 1:
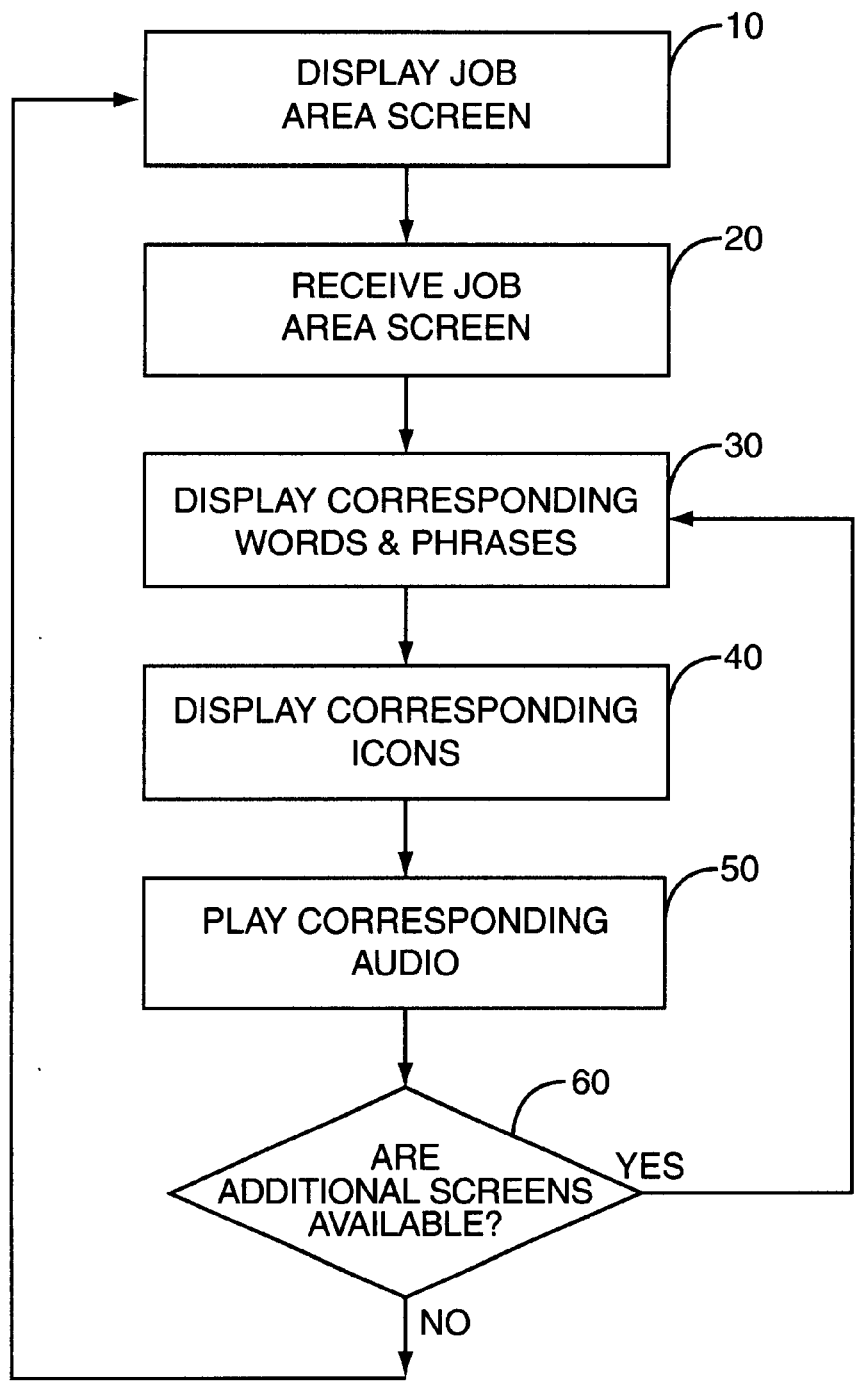
FIG. 1 is a schematic illustration of the steps in displaying the various display screens incorporated within the present invention.

FIG. 1 illustrates the logic of the tutorial software. Upon accessing the program, an initial job area screen is displayed (block 10). This display illustrates various job areas in which the user may learn specific words and phrases necessary to complete the job.

Figure 2:
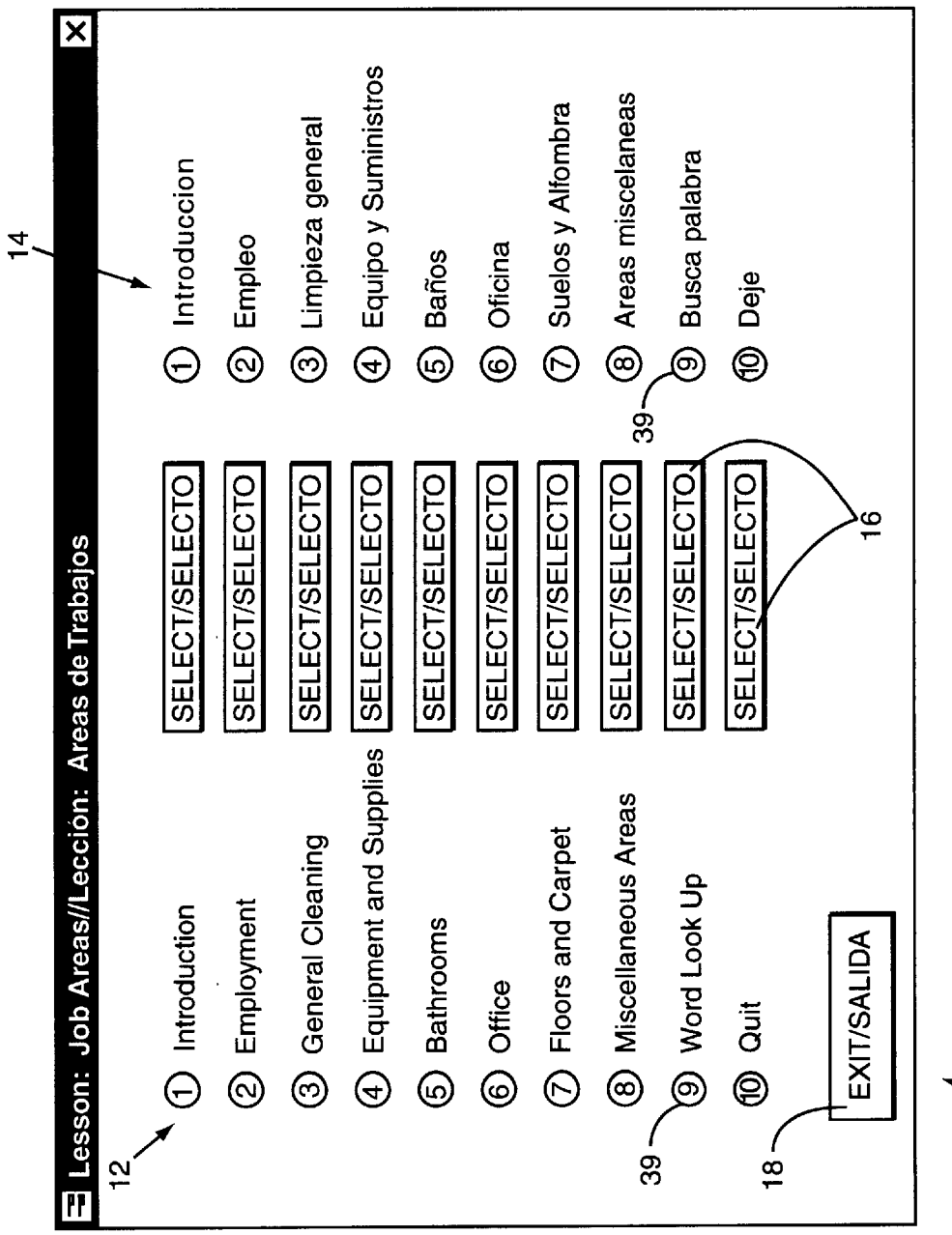
FIG. 2 is a schematic illustration of a job area selection display included within one step of the present invention.

FIG. 2 illustrates one embodiment of the job area screen 110 displayed to the user. The screen is substantially divided into two separate columns having a first column 12 displaying the job areas in a first language and a second column 14 displaying the corresponding job areas in a second language. As illustrated, one embodiment includes a first column displayed in English and a second column 14 displayed in Spanish. Input selections 16 provide for the user to select an appropriate job area in which he or she desires to review. Preferably, an exit option 18 is positioned on each screen within the program to enable the user to stop the tutorial program. Depending upon the specific software, the user may input the selected job area by moving a mouse to the desired select button 16 and inputting the entry, inputting the corresponding number or letter through a connected input device such as a keyboard, speaking into a microphone which recognizes the desired selection device 16, and various other input means commonly used in the art. The job area screen 110 may further include illustrations (not shown) further identifying the various jobs allowing the user to recognize more easily the appropriate selection opportunities.

Within each screen throughout the tutorial program, it is important that the corresponding first and second language options are displayed in a manner in which the user recognizes a correlation between the two. This concurrent viewing further reinforces the user's ability to recognize the alternate language selections. This type of display assists the user in both learning the foreign language and also memorizing specific words.

The options displayed in the job area screen are areas that the user will be exposed and will be required to communicate, both speaking the language and being able to understand and comprehend another person. An introduction selection, illustrated as selection one in FIG. 2, may also be included which provides general words that are part of everyday life and may not be related to a specific industry. Words such as "hello", "goodbye", numbers, days of the week, and other general information are included as there is a likelihood that these words will be encountered by the user. Additionally, general employment information may also be displayed, such as that illustrated as selection two in FIG. 2. This information includes general human resources information such as how much the person will be paid, distribution of paychecks, insurance coverage, retirement package, and other like information that stems from the job.

Returning to FIG. 1, after the user has input the desired job area by inputting the selection means 16, the program receives a job area selection (block 20) and thereafter displays the corresponding words and phrases corresponding to the selection (block 30). Depending upon the input selected by the user, the program will further display corresponding icons (block 40) and play the corresponding audio (block 50).

Figure 3:
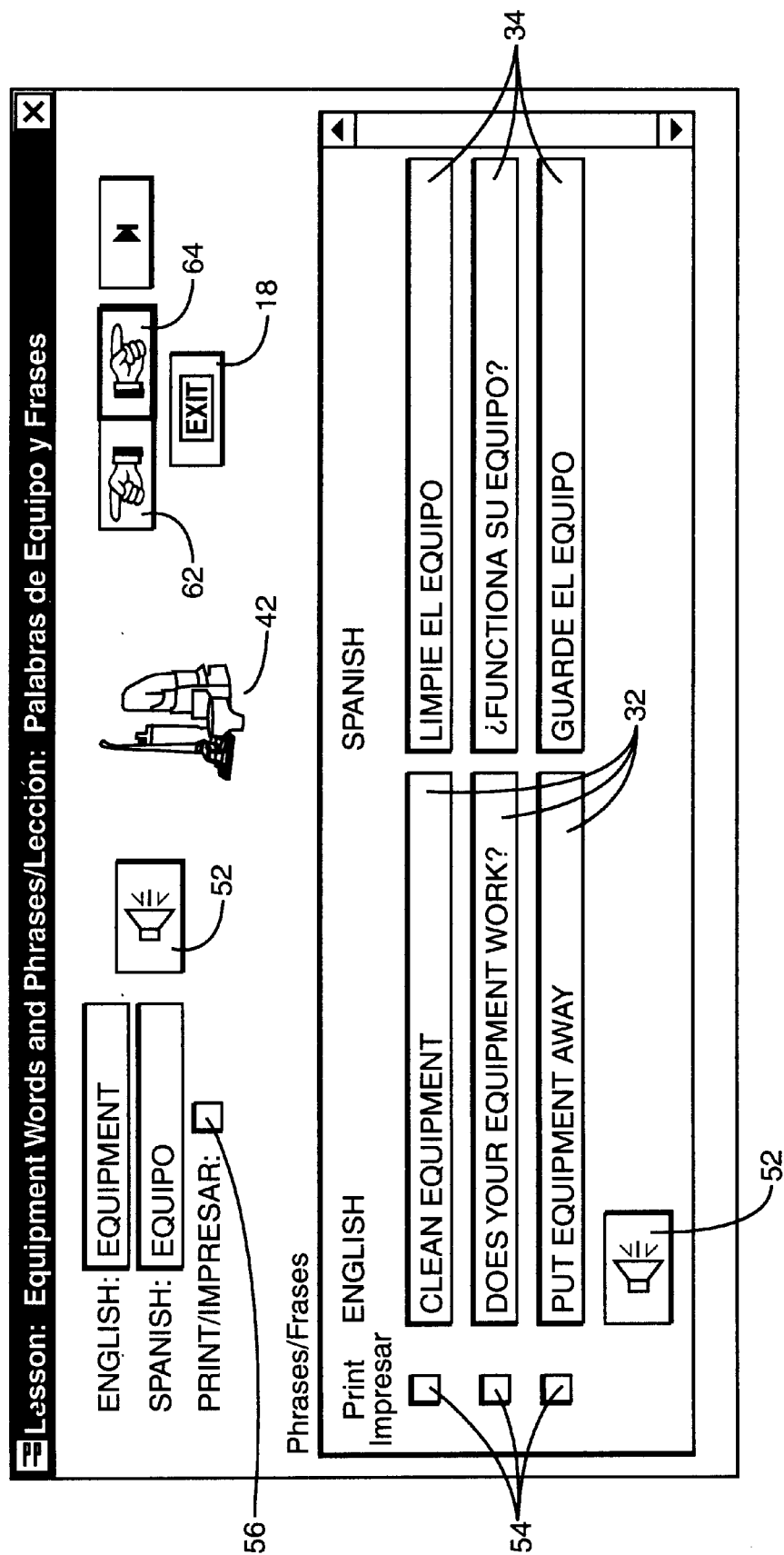
FIG. 3 is a schematic illustration of a words and phrases screen.

FIG. 3 illustrates the words and phrases display corresponding to job area 2 "equipment" or "equipo" from FIG. 2. The words and phrases again demonstrate the first set of words and phrases in the first language 32 and the corresponding words and phrases in the second language 34. The different language words and phrases are arranged such that the user will understand the corresponding and related translations. By way of example, the user will understand that the English phrase "does your equipment work" corresponds to the Spanish phrase "functiona su equipo".

An icon display 42 preferably positioned within each of the words and phrases screens further strengthens the correlation between the various languages and the corresponding items. As illustrated in FIG. 3, a general icon of various cleaning equipment is displayed because the user is within the equipment words and phrases display. A number of more specific icons may also be available within each of the displays. By way of example, if one of these specific phrases discusses operating a vacuum cleaner, an icon illustrating a vacuum cleaner may be displayed. These icons may include general illustrations of the elements, actual pictures of the equipment in which the users will be working, or video clips of the equipment of persons performing the job.

Audio output may further be available via audio selections 52. By choosing these selections, the user can hear the correct pronunciation in either the first, second, or both languages. By way of example, the user may highlight the phrase "put equipment away" and by selecting the audio selection button 52, they audibly hear how to pronounce properly the phrase in both languages.

The user is further able to receive a hard copy output by printing various areas of the display. Print selections 54,56 may be provided for printing specific words and phrases or for printing the entire screen. This allows the user to print out various areas that he or she either feels insecure about or understands that they will encounter during their job duties and would like to have a printed copy to memorialize their learning and have on-hand when necessary.

The user may further scroll to additional screens (block 60 of FIG. 1). Directional arrows 62, 64 provide the user to scroll forward and backwards to easily access information. Illustrated in FIG. 3, inputting backwards directional arrows 62 allows for the user to return to the job area screen illustrated in FIG. 2. Directional input 64 will provide for the user to see additional words and phrases corresponding to the equipment area. If no additional screens are available, the program will return to the display job area screen (block 10 of FIG. 1) to allow the user to learn a new area. Numerous other movement parameters are available and are considered part of the present invention.

The number and specificity of job areas in corresponding words and phrases are predetermined and finite in number. Preferably, tutorial software covers one specific job industry and includes areas and words and phrases necessary for a user to perform adequately their job. One example, the industrial cleaning industry, is taught. The job areas and the words and phrases necessary to perform the job are illustrated and often include words and phrases which are difficult for a person with little to no knowledge of the language to ascertain. However, these words and phrases and job areas are necessary for these users to perform adequately their job. By displaying their corresponding information in at least two separate languages, the user can quickly and easily remember and comprehend these words and allow them to perform their job. The present invention may be used to train a person completely unfamiliar with the job, and also teach a person familiar with the job the corresponding foreign translations of words and phrases that will be encountered. This system allows them to effectively communicate in the foreign language in relation to the job.

A word look up option 39 illustrated in FIG. 2 allows the user to input a specific word so they may understand the translation, or context in which the phrase is used. The phrase is input into the system, which then displays the words and phrases screens in which the word appears. The word look up option 39 may also provide an audio format for the user to hear the word in the various languages. By way of example, the user may input the word look up option 39 in FIG. 2, and then input "vacuum cleaner". The system may play the phrase in both english and spanish to allow the user to properly pronounce and comprehend the phrase. Other job areas that include this phrase will also be displayed, such as within the "floors and carpet", "office", and any others.

There are a number of different embodiments for accessing the software. The program may be saved as a software package that is accessible via a standard personal computer. The host computer may access and manipulate the program as desired via conventional input/output interface such as a keyboard, monitor, and mouse. The software may be in the form of CD-ROM, optical CD, floppy disk, or other form of computer memory as is well understood in the field of computers. Software may be written in any appropriate code as needed or desired. The user may also access the program using a remote computer to access the Internet, such as through an Internet Service Provider, such as BELL-SOUTH.NET ™, GTE.NET ™, or the like. Specifically contemplated would be accessing the World Wide Web with a web browser and from there accessing a web page on which the program is provided. Password or like protection may be used to limit access to only those persons authorized to use the program.

Certain modifications and improvements will occur to those skilled in the art upon a reading of the foregoing description. By way of example, more than two separate foreign languages may be displayed on display screens at any given time. Additionally, the software programs may include different levels of difficulty in understanding the user to perform their job. By way of example, a first words and phrases display screen may illustrate basic concepts and words will be encountered on the job and additional screens with more sophisticated and difficult concepts and words will also be located and are available for the user. The present invention may also be in a printed format such as a book. It should be understood that all such modifications and improvements have been deleted herein for the sake of conciseness and readability but are properly within the scope of the following claims.

What is claimed is:

1. A training device for teaching a user in two or more languages words that are encountered when performing a job, said device comprising a display illustrating a first word set in a first language and a second corresponding word set in a second language, said first and second word sets being placed in a correlating manner within said display, said word sets including job specific words for training the user, said-display further comprising an additional word set in at least one of said first and second languages that is displayed upon receiving a corresponding input from the user.

2. The program of claim 1, wherein said device is maintained in a computer-readable format.

3. The program of claim 1, wherein said device is accessed by the user via a network system.

4. The program of claim 1, further including a series of displays accessible by the user for teaching additional word sets.

5. The program of claim 1, further including an icon display correlating with at least one of said word sets.

6. The program of claim 1, further including an audio format correlating with at least one of said word sets.

7. The program of claim 1, wherein said word sets are industry specific.

8. The program of claim 7, wherein said word sets are selected from the group consisting of industrial cleaning, construction, landscaping, food services, law enforcement, medical, banking, and general warehouse.

9. The program of claim 7, further including a general word set of introductory words.

10. The program of claim 7, further including a general employment word set.

11. The program of claim 1, further including a word look up option.

12. A system for training an individual phrases associated with a job, said phrases being in a language foreign to the individual, said system comprising:

a) a first list of phrases associated with the job in a language native to the individual;

b) a second list of phrases associated with the job in a language foreign to the individual, each of said phrases in said second list corresponding to a different one of said phrases in said first list;

c) an input option for the user to select a particular phrase from the first list of phrases; and d) an additional list of words that are displayed upon receipt of said input option, said additional list of words being in said language native to the individual and said language foreign to the individual.

13. The system of claim 12, wherein said first and second lists of phrases are arranged in a side-by-side orientation.

14. A method of teaching the components of a task comprising the steps of:

a) displaying a first menu having predefined job areas, said predefined job areas appearing in a first language and a second language;

b) receiving an input selecting one of said predefined job areas; and c) in response to the input, displaying a plurality of words relating to the selected predefined job area in said first and second languages.

15. The method of claim 14, further including a visual representation of the plurality of words.

16. The method of claim 14, wherein said plurality of words are associated with a specific industry.

17. The method of claim 14, further including playing the plurality of words in an audio format.

18. The method of claim 17, wherein said audio format includes playing the plurality of words in at least one of the first and second languages.

19. The method of claim 14, further including printing a copy of the plurality of words in both the first and second languages.

20. The method of claim 14, further including inputting a word in a word look up option and displaying each of said job areas in which said word appears.

21. A method of creating a job communication skills tutorial comprising the steps of:

a) selecting a job position and determining functions within the job position and creating a first list comprising the functions in a first language and at least one additional language;

b) creating a second list of phrases that are related to performing the function, the second list comprising the phrases in the first language and the at least one additional language;

c) displaying the first list; and d) in response to an input, displaying the second list.

22. The method of claim 21, wherein said second list comprises a plurality of phrases each corresponding to a specific one of said functions in said first list, wherein said input selects one of said phrases from said first list, and wherein the step of in response to the input, displaying the second list comprises displaying the phrases corresponding to the input.

23. The system of claim 12, wherein said first and second lists of phrases are arranged in an adjacent orientation.

24. The device of claim 1, wherein at least one of said first word set, said second word set, and said additional word set include single words and phrases.

* * * * *